United States Patent [19]
Kim

[11] Patent Number: 5,806,908
[45] Date of Patent: Sep. 15, 1998

[54] IMPACT DAMPING DEVICE FOR DECK PANEL OF A THREE-SIDE DUMP TRUCK

[75] Inventor: Yong Pyo Kim, Kyungsangnamdo, Rep. of Korea

[73] Assignee: Hyundai Motor Company, Seoul, Rep. of Korea

[21] Appl. No.: 761,314

[22] Filed: Dec. 6, 1996

[30] Foreign Application Priority Data

Dec. 8, 1995 [KR] Rep. of Korea .................. 95-47637

[51] Int. Cl.⁶ .................................................. B62D 33/037
[52] U.S. Cl. ................................. 296/36; 296/207; 16/85
[58] Field of Search ................................. 296/32, 36, 207; 16/86 B, 86, 82, 85, 86 A, 86 R; 292/DIG. 73

[56] References Cited

U.S. PATENT DOCUMENTS 5,271,652 12/1993 Watanabe et al. .................. 296/36

*Primary Examiner*—Dennis H. Pedder
*Assistant Examiner*—Clovia Hamilton
*Attorney, Agent, or Firm*—Christie, Parker & Hale, LLP

[57] ABSTRACT

An impact damping device of a deck panel comprises a male damping member provided in one side of a sidegate of the deck panel, and a female damping member provided in a reinforcing panel. It can prevent a worker from injuring his hand due to the inverse rebound of a sidegate when it rotates and collides against a reinforcing panel.

3 Claims, 3 Drawing Sheets

IMPACT DAMPING DEVICE FOR DECK PANEL OF A THREE-SIDE DUMP TRUCK

BACKGROUND OF THE INVENTION

1. Field of the Invention

The present invention relates generally to an impact damping device for a deck panel of a three-side dump truck, and more particularly to an impact damping device having a female damping member and a male damping member capable of preventing injure to a worker's hand due to the inverse rebound of a sidegate when it rotates and collides against a reinforcing panel.

2. Description of the Prior Art

A typical example of an impact damping device described above is shown in FIGS. 1 and 2 of the accompanying drawings. A deck panel 10 mounted on a three-side dump truck for loading or unloading freight comprises a front gate 11 installed in a front side, two sidegates 12 fixed rotatably to both sides of the front gate 11, and a tailgate (not shown). The sidegates 12 have at each side a lock lever fixed rotatably to the sidegate in order to lock or release the tailgate. Reinforcing panels 13 for supporting a floor are provided to undersides of the sidegates. And, each reinforcing panel 13 has a rubber buffer 14, so that when the sidegate 12 opens, it may reduce noise occurring at the moment the sidegate collides with the reinforcing panel.

When loading or unloading freight on the floor of the above described truck, a worker grips the lever which locks the tailgate of the deck panel 10, and then rotates the lever. The lock lever is rotated about a hinge pin, and the tailgate locked on the sidegate 12 is released from it. At the same time, after opening the sidegate 12 hinged to the tailgate, a worker loads or unloads freight. At this time, when the sidegate 12 opens, the one side of the sidegate collides against the rubber buffer 14 of the reinforcing panel 13, so that the noise of collision may be reduced.

Because the one side of the reinforcing panel is provided with such a rubber buffer in order to dampen the impact and to reduce the noise occurring when opening the sidegate, however, a problem may take place in that the inverse rebound of the sidegate caused by its rotation causes a worker to injure his hand.

Other example of an impact damping device described above is disclosed in U.S. Pat. No. 5,271,652. The device comprises a spring provided on an underside of a loading deck, and a swing link provided below a side end portion of the loading deck. The tip of the swing link and an outer surface of a sidegate are connected together through a connecting link in such a manner that the tip of the swing link points obliquely upward or downward when the sidegate is closed or fully open, respectively. However, the device is of large size and needs a number of parts, thereby increasing its manufacturing cost.

SUMMARY OF THE INVENTION

In order to solve the problems as described above, an object of the present invention is to provide an impact damping device of a deck panel, wherein one side of a sidegate of the deck panel is provided with a male damping member including a boss having the push-button embedded therein, and a reinforcing panel is provided with a female damping member, such that it can prevent a worker from injuring his hand due to the inverse rebound of the sidegate when the sidegate rotates and collides against the reinforcing panel.

According to an aspect of the present invention, in a deck panel including a reinforcing panel supporting a floor of the deck panel and a sidegate coupled to one side of the reinforcing panel, a device for damping an impact occurring when opening the sidegate comprising: a male damping member provided in the sidegate for releasing the sidegate, which comprises a push-button embedded in an insertion hole formed on the sidegate, for releasing the locked sidegate; a resilient piece fixed integrally to one end of the push-button and expanding when operating the push-button; a first spring coupled to a center of the resilient piece for returning the push-button to its original position; and a boss coupled to the other end of the first spring and to the sidegate for protruding a leading end of the push-button, and a female damping member provided in the reinforcing member for locking the sidegate, which comprises a pair of a locking piece fixed integrally within the female damping member and having a bending portion, for locking the boss when inserting the boss; a third spring coupled to the bending portion for locking and releasing the boss by biasing the locking piece; and a frame placed above the upper surface of the pair of bending portion and coupled to a fourth spring to rise and lower when the boss inserts and releases.

BRIEF DESCRIPTION OF THE DRAWINGS

The above objects, other aspects, and advantages of the invention will become apparent by describing the preferred embodiment thereof with reference to the accompanying drawings, in which.

DESCRIPTION OF THE PREFERRED EMBODIMENT

Figure 1:
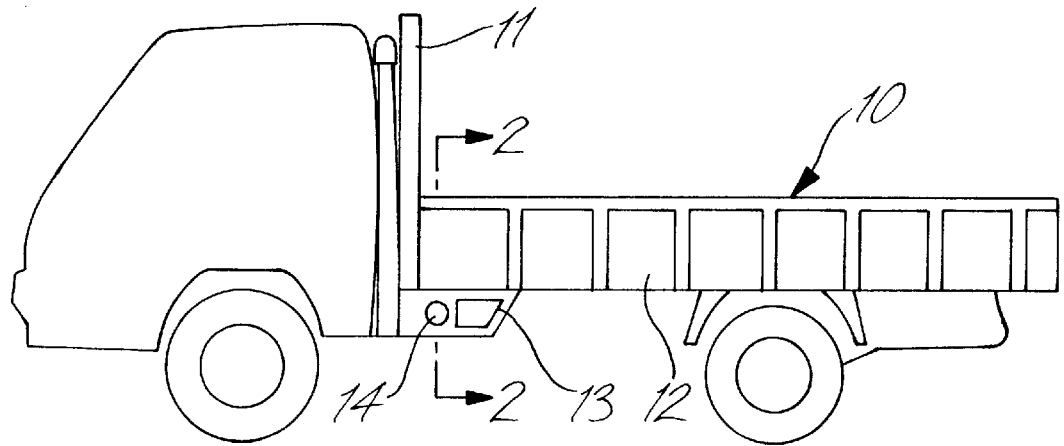
FIG. 1 is a perspective side view of a prior art deck panel.
Figure 2:
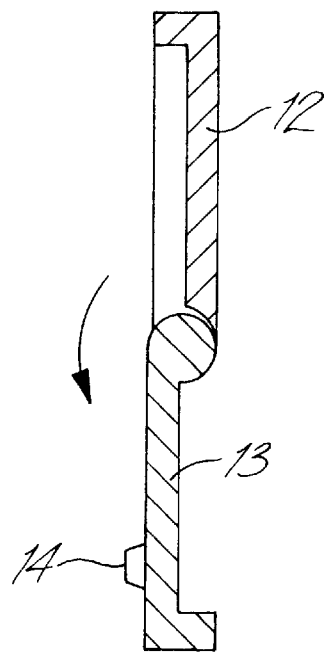
FIG. 2 is a sectional view taken along the plane 2—2 of FIG. 1.
Figure 3:
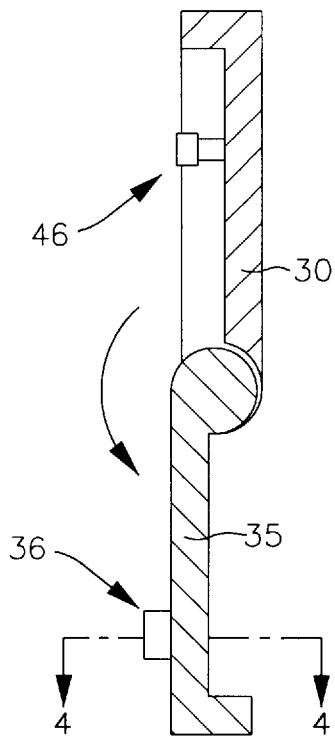
FIG. 3 is a perspective side view of a impact damping device of a deck panel according to the present invention, which has a male damping member and a female damping member.
Figure 4:
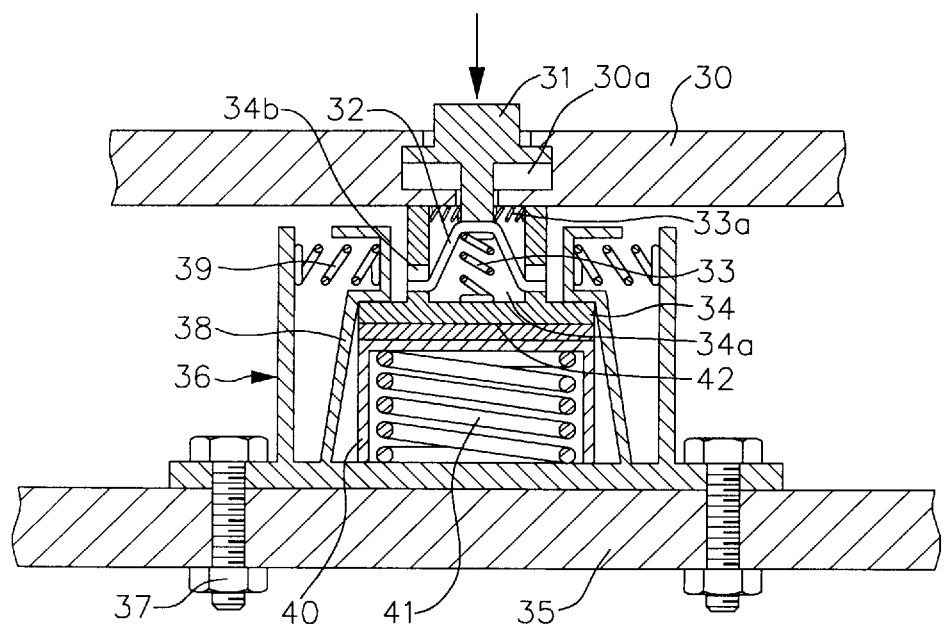
FIG. 4 is a sectional view taken along the plane 4—4 of FIG. 3.

An impact damping device according to the present invention is shown in FIGS. 3 and 4, wherein the impact damping device comprises a female and male damping member.

Referring now to the male damping member 46, a sidegate 30 of a deck panel is provided with an insertion hole 30a inserted with a push-button 31, and a resilient piece 32 is integrally fixed to one end of the push-button 31. An one of a biasing member, for example, a first spring 33 is coupled to the center part of the resilient piece 32 and a second spring 33a is coupled to both sides of the push-button 31.

The other end of the first spring 33 coupled to the resilient piece 32 is connected to a boss 34 mounted on the one side of the sidegate 30. A hollow portion 34a is formed in the boss 34 so as to protrude the leading end of the push-button 31, and two through holes 34b are formed at a circumference of the boss, through which the both ends of the resilient piece 32 are inserted. It is preferable to keep silence by attaching a rubber plate 42 to the outer surface of the boss 34 when contacting with a reinforcing panel 35, as will be described below.

Also, to the one side colliding against the side of the sidegate 30 in opening the latter, a female damping member 36 is clamped by a fastening bolt 37 in order to reduce an instant impact. The female damping member 36 comprises a pair of locking pieces 38 integrally fixed thereto and each having a bending portion, and third springs 39 coupled to the bending portions for locking or releasing the boss 34 by expanding the locking pieces 38 when inserting the boss 34.

A frame 40 of an inverted-cup shape is placed on the upper surfaces of the pair of locking pieces 38, and lowers when inserting the leading end. The underside of the frame 40 is coupled to a fourth spring 41 in order to return the frame 40 in its original position when the boss 34 is releasing.

The operation of the above described impact damping device of the deck panel according to the present invention will now be explained with reference to FIGS. 5 and 6.

In case of loading or unloading freight on the floor of the deck panel, if worker grips the lock lever coupled rotatably to the sidegate and then rotates the lever, the locking condition of the tailgate is released. In this state, the sidegate 30 is rotated and opened in order to carry out easily loading and unloading.

After then, when the opened side of the sidegate 30 collides against the reinforcing panel 35, one end of the boss 34 mounted on the one side of sidegate 30 have been locking on the damping member 36 of the reinforcing panel 35. In other words, the leading end of the boss 34 pushes and inserts into the frame 40, and at the same time, when the boss 34 is inserted into a certain extent, the pair of locking pieces 38 are moved in the inward direction by the third springs 39 coupled to the bending portions, thereby locking the boss 34, as shown in FIG. 4. At this time, the fourth spring 41 connected to the frame 40 is maintained in the condition of compression so that the noise due to the instant collision in opening the sidegate may be reduced.

Figure 5:
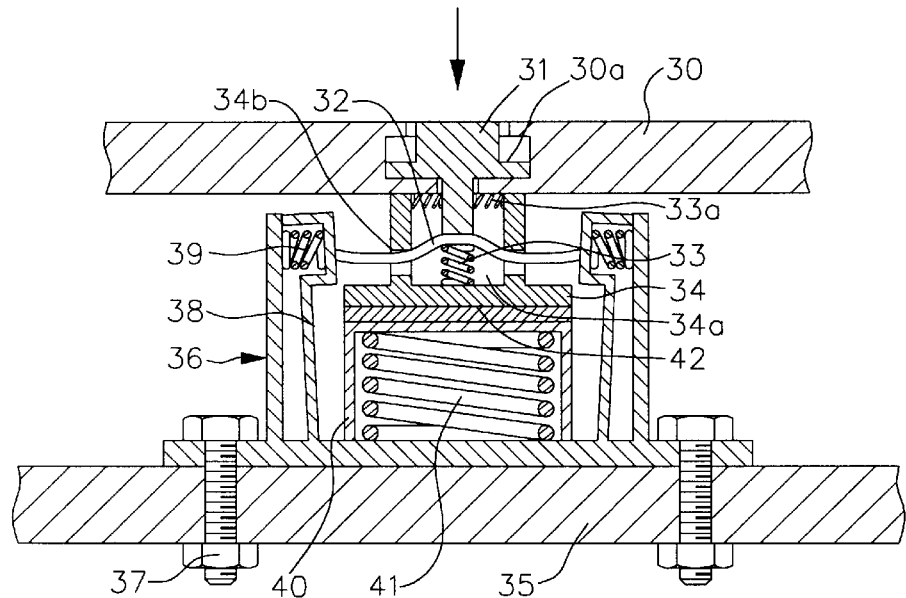
FIG. 5 is a view of showing a lock state of the deck panel.
Figure 6:
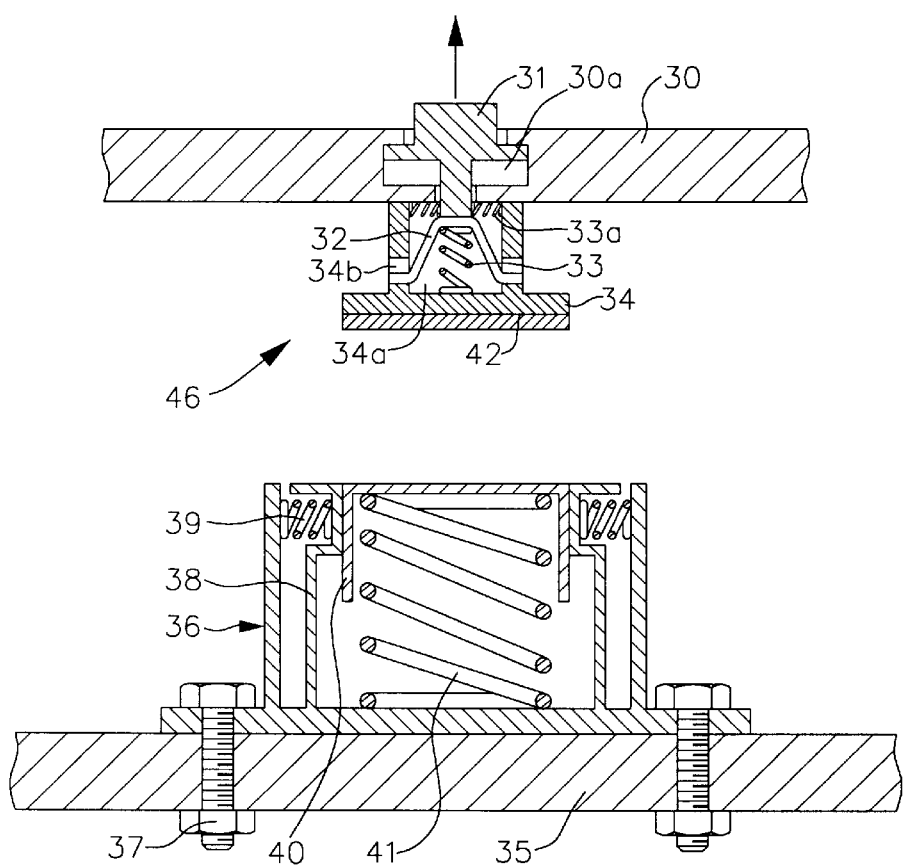
FIG. 6 is a view of showing a release state of the deck panel.

Meanwhile, after completing the loading or unloading, when releasing the sidegate, a worker pushes the push-button inserted in the insertion hole 30a of the sidegate 30, as shown in FIG. 5, such that the resilient piece 32, of which both ends are passed through the through hole 34b of the boss 34, is expanded with the first spring 33 being compressed. And then, the locking pieces 38 which lock the boss 34 are retracted, thereby releasing the sidegate 30.

And then, the frame 40 is rises with the compressed fourth spring 41 returning in its original position. Upon rising the frame 40, the sidegate 30 is fully released by pushing the boss 34 outwardly, as shown in FIG. 6. The biasing force of the third springs 39 coupled to the bending portions of the locking pieces 38 causes the latter to return in its initial condition.

With the impact damping device of the deck panel according to the present invention as described hereinbefore, wherein the one side of the sidegate of the deck panel is provided with the male damping member having the boss with the push-button embedded therein, and the reinforcing panel is provided with the female damping member, by which both members cooperate to dampen the instance impact by locking the sidegate when opening the latter, it can prevent worker from injuring his hand due to the inverse rebound of a sidegate when it rotates and collides against a reinforcing panel.

While the present invention has been described and illustrated herein with reference to the preferred embodiment thereof, it will be understood by those skilled in the art that various changes in form and details may be made therein without departing from the spirit and scope of the invention.

What is claimed is:

1. In a deck panel including a reinforcing panel supporting a floor of the deck panel and a sidegate coupled to one side of the reinforcing panel, a device for damping an impact occurring when opening the sidegate comprising:

a male damping member provided in the sidegate for releasing the sidegate, which comprises a push-button embedded in an insertion hole formed on the sidegate, for releasing the locked sidegate; a resilient piece fixed integrally to one end of the push-button and expanding when operating the push-button; a first spring coupled to a center of the resilient piece for returning the push-button to its original position; and a boss coupled to the other end of the first spring and to the sidegate for protruding a leading end of the push-button; and a female damping member provided in the reinforcing member for locking the sidegate, which comprises a pair of locking pieces fixed integrally within the female damping member and having bending portions, for locking the boss when inserting the boss; third springs coupled to the bending portions for locking and releasing the boss by biasing the locking pieces; and a frame placed above the upper surface of the pair of bending portions and coupled to a fourth spring to rise and lower when the boss inserts and releases.

2. The device as claimed in claim 1, wherein second springs are coupled to both sides of the push-button to prevent movement when operating the push-button.

3. The device as claimed in claim 1, wherein the circumference of the boss is provided with through holes, through which ends of the resilient piece pass.

* * * * *